(12) United States Patent
Rutledge

(10) Patent No.: US 7,753,010 B2
(45) Date of Patent: Jul. 13, 2010

(54) ENERGY CONVERSION SYSTEM FOR HYDROGEN GENERATION AND USES THEREOF

(76) Inventor: Keith Rutledge, 28100 Blue Lake Rd., P.O. Box 94, Willits, CA (US) 95490

( * ) Notice: Subject to any disclaimer, the term of this patent is extended or adjusted under 35 U.S.C. 154(b) by 530 days.

(21) Appl. No.: 11/383,536

(22) Filed: May 16, 2006

(65) Prior Publication Data
US 2007/0169723 A1    Jul. 26, 2007

Related U.S. Application Data

(60) Provisional application No. 60/681,023, filed on May 16, 2005.

(51) Int. Cl.
*F02B 43/08*    (2006.01)
(52) U.S. Cl. .................................... 123/3; 180/65.31
(58) Field of Classification Search ............... 180/65.2, 180/65.3, 44, 60; 429/9, 254; 290/14, 17, 290/51; 105/50; 123/27 GE, 525, 25 B, 123/295, 556, 572
See application file for complete search history.

(56) References Cited

U.S. PATENT DOCUMENTS

| | | | | |
|---|---|---|---|---|
| 3,771,821 | A * | 11/1973 | Rist et al. | ............ 290/14 |
| 4,090,577 | A * | 5/1978 | Moore | ............ 180/243 |
| 5,306,577 | A | 4/1994 | Sprouse | |
| 5,343,699 | A | 9/1994 | McAlister | |
| 5,376,470 | A | 12/1994 | Sprouse | |
| 5,394,852 | A | 3/1995 | McAlister | |
| 5,540,831 | A | 7/1996 | Klein | |
| 5,851,698 | A | 12/1998 | Reichman | |
| 5,856,047 | A | 1/1999 | Venkatesan | |
| 6,209,493 | B1 | 4/2001 | Ross | |
| 6,330,925 | B1 | 12/2001 | Ovshinsky | |
| 6,488,345 | B1 | 12/2002 | Woody | |
| 6,492,056 | B1 | 12/2002 | Ovshinsky | |
| 6,508,210 | B2 * | 1/2003 | Knowlton et al. | ............ 123/3 |
| 6,516,905 | B1 | 2/2003 | Baumert | |
| 6,565,836 | B2 | 5/2003 | Ovshinsky | |
| 6,620,539 | B2 | 9/2003 | Ovshinsky | |
| 6,698,389 | B2 | 3/2004 | Andrews | |
| 6,703,156 | B2 | 3/2004 | Ovshinsky | |
| 6,756,140 | B1 | 6/2004 | McAlister | |
| 6,759,034 | B2 | 7/2004 | Ovshinsky | |
| 6,770,186 | B2 | 8/2004 | Rosenfeld | |
| 6,777,125 | B2 | 8/2004 | Ovhsinsky | |
| 6,783,891 | B2 | 8/2004 | Ovshinsky | |
| 6,790,551 | B2 | 9/2004 | Venkatesan | |

(Continued)

*Primary Examiner*—Stephen K Cronin
*Assistant Examiner*—Keith Coleman
(74) *Attorney, Agent, or Firm*—Matthew A. Pequignot; Pequignot + Myers LLC

(57) ABSTRACT

The present invention relates to a system capable of using kinetic/inertial and renewable energy to generate hydrogen for use as a fuel in vehicles and other applications. In certain embodiments, this invention relates to a system in which hydrogen is generated during vehicle braking and which is operable with an internal combustion engine, and which can be retrofitted to vehicles with such an engine as well as to stationary combustion devices. Methods for generating hydrogen to power vehicles and vehicles utilizing the inventive technology are also provided. The present invention also relates to stationary devices, such as space heaters and water heaters, capable of generating hydrogen for use as a fuel additive therewith, and methods of generating hydrogen using such devices.

17 Claims, 9 Drawing Sheets

U.S. PATENT DOCUMENTS

| | | |
|---|---|---|
| 6,833,207 B2 | 12/2004 | Joos |
| 6,866,350 B2 | 3/2005 | Palmer |
| 6,875,536 B2 | 4/2005 | Ovshinsky |
| 6,896,789 B2 | 5/2005 | Ross |
| 6,924,569 B2 | 8/2005 | Endo |
| 2002/0179454 A1 | 12/2002 | Ross |
| 2003/0051393 A1 | 3/2003 | Stickney |
| 2003/0059664 A1 | 3/2003 | Menjak |
| 2003/0091503 A1 | 5/2003 | Rosenfeld |
| 2003/0091880 A1 | 5/2003 | Joos |
| 2003/0129459 A1* | 7/2003 | Ovshinsky et al. ............. 429/9 |
| 2003/0189376 A1 | 10/2003 | Schneider |
| 2003/0207156 A1 | 11/2003 | Ovshinsky |
| 2004/0053109 A1 | 3/2004 | Ovshinsky |
| 2004/0131906 A1 | 7/2004 | Ovshinsky |
| 2004/0137290 A1 | 7/2004 | Woods |
| 2004/0159480 A1 | 8/2004 | Ishikawa |
| 2004/0205032 A1 | 10/2004 | Routtenberg |
| 2004/0211613 A1* | 10/2004 | Asao et al. ................... 180/291 |
| 2005/0211480 A1* | 9/2005 | Kejha ........................ 180/65.2 |
| 2005/0229872 A1 | 10/2005 | Lange |
| 2005/0285461 A1 | 12/2005 | Kitamura |

* cited by examiner

ENERGY CONVERSION SYSTEM FOR HYDROGEN GENERATION AND USES THEREOF

RELATED APPLICATIONS

This application claims priority to U.S. Provisional Patent Application No. 60/681,023, filed on May 16, 2005, which is hereby incorporated by reference in its entirety.

FIELD OF THE INVENTION

The present invention relates to systems capable of using kinetic/inertial and renewable energy to generate hydrogen as a fuel for use in vehicles and other applications. In certain other embodiments, this invention relates to a system for the generation and use of hydrogen fuel to be mixed with an existing fuel supply for use with a variety of mobile and stationary devices. In certain preferred embodiments, this invention relates to a system in which hydrogen is generated during a vehicle braking operation for use as a fuel with an internal combustion engine, and which can be retrofitted to vehicles with such an engine.

BACKGROUND OF THE INVENTION

During recent decades, it has been recognized that the growing abundance of commercial and passenger vehicles (e.g. which principally employ internal combustion engines) is resulting in a rapid depletion of earth's natural, unrenewable resources (e.g. fossil fuels). Moreover, the incredible volumes of exhaust gases which are emitted during the world's vehicle operations are causing detrimental changes to the earth's environment. As a result, many efforts have been undertaken in recent years to either improve the fuel efficiency of vehicles, provide vehicles which are less dependant (or not dependant at all) on unrenewable fuel resources (e.g. fossil fuels), and/or which output fewer or less damaging emissions.

For example, certain models of hybrid vehicles have recently become available on the consumer market. Such vehicles rely on a combination of battery power and a conventional internal combustion engine to power the vehicles. In one example, in a series hybrid vehicle, the internal combustion engine drives a generator to provide electricity to an electric motor (e.g. which is typically separately powered by batteries). In contrast, in a parallel-configured hybrid vehicle, the internal combustion engine can also power the drive train directly. Among related, known systems for improving the energy efficiency of such hybrid vehicles are systems for capturing the inertial energy of the vehicle during braking operations (i.e. so-called "regenerative braking systems"). Employing such a system in one example, a hybrid vehicle uses an electric motor to create torque to drive its wheels. The electric motor, in turn, is operated in reverse when the vehicle is braking (i.e. using the vehicle's inertial energy) to create electricity, i.e. the electric motor thus acting as an electric generator to recharge storage batteries. As may be expected, known hybrid vehicles (e.g. employing regenerative braking systems) are more efficient than a typical internal combustion powered vehicle.

Other efforts to improve the energy efficiency and detoxify the output emissions of vehicles involve the use of hydrogen powered fuel cells. The fuel cell installed in the vehicle produces electricity which, in turn, is used to power an electric motor for operating the vehicle. The principal benefit of using fuel cells, as is widely known, is that their output emissions consist entirely of water. Therefore, if hydrogen for powering the fuel cell is obtained from a non-fossil fuel type source, for example, significant efficiency and emissions advantages are achieved over conventional internal combustion vehicles.

Further, systems are known which permit the on-board generation of hydrogen gas for use as a fuel additive to an internal combustion engine. The use of hydrogen gas as a fuel additive is known to increase the efficiency of internal combustion engines and reduce pollutants, as a result of relatively more complete combustion of the fuel in the combustion chamber. Such systems employ, for example, an electrolysis cell to generate hydrogen gas and a conduit which introduces the hydrogen gas to the engine's air intake manifold. The electrolysis cell is typically powered by the vehicle's battery charging system. However, such systems have numerous drawbacks including, for example, that a load is placed on the vehicle's engine and battery charging system to power the electrolysis cell, and that hydrogen gas is only generated when the vehicle is operating and is used without being stored. Because hydrogen is only generated when the vehicle is operating, such systems are not suitable for use in situations where the vehicle is turned off or cannot or should not be allowed to idle, as is often the case with tractor trailers as well as passenger vehicles.

Despite the promising prospects of the various types of hybrid and hydrogen-powered vehicles slowly emerging in the marketplace (both as described herein or as otherwise known), widespread production and/or sales of such vehicles is not expected for many years. This is due in part to the reluctance of automobile manufacturers to expend significant portions of their resources on non-market tested products, the inability of the typical consumer to afford to replace their existing vehicle, as well as limitations with current technologies.

Nevertheless, the need for cleaner emission vehicles which exhibit increased energy efficiency persists. Therefore, it would be desirable to provide in the marketplace an apparatus or system which is adaptable to existing conventional vehicles, when desired, and which addresses one or more of the above-described needs at an affordable cost (e.g. a cost which is affordable to the "average American consumer" and/or which provides a cost benefit to industry such that the use of such an apparatus or system would be desirable). Moreover (or alternatively), it would be desirable to provide an apparatus or system which is installable and/or adaptable to a conventional vehicle with minimal modification and/or mechanical complexity (e.g. and thus with minimal technical skills being required). In addition to such adaptable configurations, it would be desirable if such a system was capable of being manufactured directly into a vehicle, when desired, and also if such a system were capable of being modified for a variety of mobile as well as stationary applications.

In view of the above-enumerated drawbacks with existing technologies and the need which persists for new and improved technologies, it is apparent that there exists a need in the art for apparatus and/or methods which solve and/or ameliorate at least one of the enumerated problems, for example the problems which persist with current hydrogen fuel generation systems in internal combustion vehicles. It is a purpose of this invention to fulfill these needs in the art as well as other needs disclosed and taught herein and which further will become more apparent to the skilled artisan once given the following disclosure.

SUMMARY OF THE INVENTION

The use of hydrogen, when combined with conventional fossil fuels (e.g. gasoline), is capable of extending the lean limit of such conventional fuels in order to achieve higher efficiency and lower pollutant emissions in a conventional internal combustion engine or other combustion equipment. More specifically, for example, because of its wide flammability limits and high flame speeds, hydrogen-enriched fuel lends itself readily to ultra lean combustion and may allow the use of higher compression ratios.

In order, in part, to utilize one or more of the advantages of hydrogen enriched fuels, the present invention relates to a system capable of using kinetic/inertial and renewable energy to generate hydrogen for use in vehicles and other applications. In certain embodiments, this invention relates to a system in which hydrogen is generated during vehicle braking and which is operable with an internal combustion engine, and which can be retrofitted to vehicles with such an engine.

In one embodiment, the present invention relates a vehicle hydrogen generation retrofit kit, comprising a generator/alternator for generating electricity, wherein the generator/alternator is capable of engaging a vehicle member or moving surface; an electrolyzer connected to the generator/alternator, wherein the electrolyzer utilizes the electricity to generate hydrogen; a storage tank connected to the electrolyzer for receiving and storing the hydrogen generated by the electrolyzer; a hydrogen delivery member connected to the storage tank for providing the hydrogen to a vehicle engine, such as an internal combustion engine, and wherein, when the generator/alternator is coupled to a vehicle member or moving surface, energy from a vehicle member or moving surface is transferred to the generator/alternator upon vehicle braking.

In some embodiments, the vehicle member is a drive shaft, an engine or engine component, or a wheel, tire or axle, and the generator/alternator may engage the wheel through electromagnetic coupling and may engage the engine or engine part through a belt. In other embodiments, the alternator/generator/alternator may be coupled to a moving surface external of the vehicle, such as a trailer. The vehicle hydrogen generation retrofit kit may also include a member for mixing the hydrogen with a fossil fuel, such as a pressure regulator, a receptacle for storing water for use by the electrolyzer to generate hydrogen, and an engagement member for increasing the field of the generator/alternator, such as a mechanical potentiometer, an electrical potentiometer, a rheostat or a computer control member such as a pulse-width modulated current device.

In some embodiments, the present invention relates to a vehicle hydrogen generation retrofit kit, comprising a generator/alternator for generating electricity, wherein the generator/alternator is capable of engaging a vehicle member or moving surface; a solar member for generating electricity from sunlight; an electrolyzer connected to the generator/alternator and/or the solar member, wherein the electrolyzer utilizes electricity produced by the generator/alternator and/or the solar member to generate hydrogen; a storage tank connected to the electrolyzer for receiving and storing the hydrogen generated by the electrolyzer; a hydrogen delivery member connected to the storage tank for providing the hydrogen to a vehicle internal combustion engine, and wherein, when the generator/alternator is coupled to a vehicle member or moving surface, energy from a vehicle member or moving surface is transferred to the generator/alternator upon vehicle braking. The generator/alternator may be coupled to part of the vehicle or to a member external to the vehicle, as previously discussed.

In some embodiments, the present invention relates to a method for generating hydrogen for use as a fuel, the method comprising the steps of: (a) providing a generator/alternator for generating electricity, wherein the generator/alternator is coupled to a vehicle member or moving surface; (b) providing an electrolyzer connected to the generator/alternator, wherein the electrolyzer utilizes the electricity to generate hydrogen; (c) providing a storage tank connected to the electrolyzer for receiving and storing the hydrogen generated by the electrolyzer; and (d) providing a hydrogen delivery member connected to the storage tank for providing the hydrogen to a vehicle engine, and wherein, energy is transferred from the vehicle member or moving surface to the generator/alternator during vehicle braking.

In some embodiments of the inventive methods, the vehicle member is a drive shaft, an engine or engine component, or a wheel, tire or axle, and the generator/alternator may engage the wheel through electromagnetic coupling and may engage the engine or engine part through a belt. In other embodiments, the alternator/generator/alternator may be coupled to a moving surface external of the vehicle, such as a trailer. The vehicle hydrogen generation retrofit kit may also include a member for mixing the hydrogen with a fossil fuel and a receptacle for storing water for use by the electrolyzer to generate hydrogen.

In some embodiments, the present invention relates to a vehicle, comprising an internal combustion engine; a generator/alternator for generating electricity, wherein the generator/alternator is coupled to a vehicle member or moving surface; an electrolyzer connected to the generator/alternator, wherein the electrolyzer utilizes the electricity to generate hydrogen; a storage tank connected to the electrolyzer for receiving and storing the hydrogen generated by the electrolyzer; and a hydrogen delivery member connected to the storage tank for providing the hydrogen to a vehicle engine, and wherein, when the generator/alternator is coupled to a vehicle member or moving surface, energy from a vehicle member or moving surface is transferred to the generator/alternator upon vehicle braking.

In some embodiments of the inventive vehicle, the vehicle member is a drive shaft, an engine or engine component, or a wheel, tire or axle, and the generator/alternator may engage the wheel through electromagnetic coupling and may engage the engine or engine part through a belt. In other embodiments, the alternator/generator/alternator may be coupled to a moving surface external of the vehicle, such as a trailer. The vehicle hydrogen generation retrofit kit may also include a member for mixing the hydrogen with a fossil fuel and a receptacle for storing water for use by the electrolyzer to generate hydrogen.

In some embodiments, the present invention relates to a method for generating hydrogen for use as a fuel, the method comprising the steps of: (a) providing a renewable energy generator for generating electricity; (b) providing an electrolyzer connected to the renewable energy generator, wherein the electrolyzer utilizes the electricity to generate hydrogen; (c) providing a hydrogen storage tank connected to the electrolyzer for receiving and storing the hydrogen generated by the electrolyzer; and (d) providing a hydrogen delivery member connected to the storage tank for providing the hydrogen to a stationary device which utilizes combustion of fossil fuel, and wherein the renewable energy generator is capable of being powered by energy provided by the renewable energy generator.

In some embodiments, the renewable energy generator may be powered by a renewable energy source selected from the group consisting of solar electric, wind, water, and biomass, and the stationary device is selected from the group consisting of space heaters and water heaters.

In another embodiment, the present invention relates to a stationary device for generating hydrogen for use as a fuel, the device comprising a renewable energy generator for generating electricity; an electrolyzer connected to the renewable energy generator, wherein the electrolyzer utilizes the electricity to generate hydrogen; a hydrogen storage tank connected to the electrolyzer for receiving and storing the hydrogen generated by the electrolyzer; a hydrogen delivery member connected to the storage tank for providing the hydrogen to a stationary device which utilizes combustion of fossil fuel, and wherein, the renewable energy generator is capable of being powered by energy provided by the renewable energy generator.

DETAILED DESCRIPTION OF CERTAIN EMBODIMENTS

Figure 1:
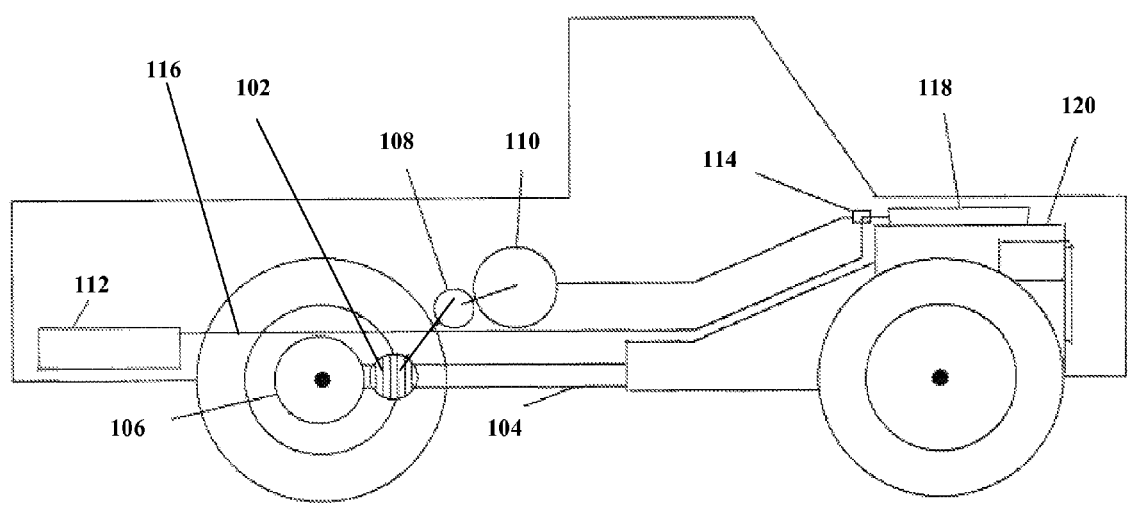
FIG. 1 shows a H-Brake kinetic/inertial energy conversion, storage and fuel mixture control kit with a drive shaft mounted generator/alternator of the present invention.

For a more complete understanding of the present invention and advantages thereof, reference is now made to the following description of various illustrative and non-limiting embodiments thereof, taken in conjunction with the accompanying drawings in which like reference numbers indicate like features.

The present invention relates to systems capable of using energy to generate hydrogen for use in mobile and stationary devices (hereinafter referred to generally as "H-Generation Systems"). For example, in a preferred embodiment, the present invention relates to a system that is capable of using the kinetic/inertial energy of a vehicle to generate hydrogen for use as a fuel or fuel additive in vehicles and other applications.

As used in vehicular applications, for example tractor trailers, trucks and passenger cars, a system of the present invention may be used to generate hydrogen during a vehicle braking operation, wherein such a system is operable with an internal combustion engine and can be retrofitted to such an engine (such systems being referred to herein as the "H-Brake"). In such applications, the kinetic/inertial energy of the vehicle is converted into electrical energy during the vehicle braking operation, and the thus produced electrical energy is used to drive a hydrogen-generation process. In certain other embodiments, the H-Brake relates to a system that is operable with any device producing kinetic/inertial energy, for example an elevator or lift crane, wherein energy is recaptured during slowing/stopping of the device and provided for a useful purpose.

As used throughout the present application, words are understood to be given their ordinary meaning, as understood by one of ordinary skill in the relevant art, unless specifically stated otherwise. For example, as used in the present invention, "coupled" refers simply to two members which are engaged, connected or otherwise in relation to each other such that energy may be transferred from the first member to the second member. Coupling may include, for example and without limitation, direct mechanical coupling, friction coupling and/or electromagnetic coupling. For example, direct mechanical coupling may refer to a first gear having its teeth interlocked with a second gear, such that movement of the first gear results in movement of the second gear. Friction coupling may refer, for example, to a first member being engaged to a second member through a belt, such as how a generator/alternator may be coupled to an internal combustion engine in the present invention. Further, a "solar member" refers, for example to any photovoltaic cell/solar module, such as a panel, which is capable of converting solar energy into electricity. "Regenerative" refers, for example, to the capturing of some of a moving vehicle's kinetic/inertial energy and converting that energy to electrical energy which is used to drive a process for the generation of hydrogen gas for use by the vehicle upon acceleration, thereby regenerating fuel through conversion of braking energy. As such "regenerative braking" refers to this process as it occurs during a vehicle braking operation.

Still further, as used in the present invention, a "generator/alternator" is any device that produces electricity and includes, for example, conventional vehicle generators and alternators (for example a conventional vehicle alternator that converts mechanical energy into alternating current and, subsequently, direct, current). In certain aspects of the present invention, for example, energy is transferred during a vehicle braking operation from the vehicle (such as from the drive shaft) to the vehicle alternator, the result being that such energy is regenerated rather than lost (as is typically the case where energy is released as heat during vehicle braking). The energy thus produced by the alternator is used to drive the hydrogen generation process. Still further, an "electrolyzer" is, for example, any device which can generate hydrogen from water and/or an aqueous electrolytic solution. Still further, as used in the present invention, "hydrogen generation" refers to any process that results in the production/generation of hydrogen in any state, and in particular hydrogen gas. For example, in the present invention, an electrolyzer may be used to "generate" hydrogen (as well as oxygen) from water and/or an electrolytic solution.

In a preferred embodiment, the H-Brake relates to a system for generating hydrogen to be mixed with fossil fuel in a conventional internal combustion engine. The hydrogen is generated through a regenerative braking system, such as, for example, where a vehicle's kinetic/inertial energy is transferred from it's drive shaft to a generator/alternator which produces electricity that is used by an electrolyzer to generate hydrogen gas from an electrolytic solution. In other embodiments, the kinetic/inertial energy of the vehicle may be transferred from other parts of the vehicle, such as the engine (for example, where the generator/alternator is friction-coupled to the engine through a belt), wheels, tire or axle, or may be transferred from an externally attached device, for example a trailer that is hitched to the rear of the vehicle. The thus-generated hydrogen gas is stored and then provided, as needed, to the engine as a fuel-additive for mixture with gasoline.

The hydrogen-enriched gasoline formulation resulting from the H-Brake has numerous advantages over traditional gasoline formulations, including extending the lean limit of conventional fuels in order to achieve higher efficiency and lower pollutant emissions in a conventional internal combustion engine. Because of its wide flammability limits and high flame speeds, the hydrogen-rich fuel lends itself readily to ultra lean combustion and may allow the use of higher compression ratios. Combining the increase in heating value, the recovery of waste energy from the engine exhaust, lean operation and higher compression ratios provides potentially high increase in thermal efficiency for the hydrogen-enriched fuels over that of the conventional fuels.

Moreover, the H-Brake is adaptable as a retrofit kit which is capable of being installed on existing vehicles having internal combustion engines, thus providing to such vehicles certain performance, efficiency and environmental benefits attendant to electric battery and hydrogen-powered hybrid vehicles, but without the need for the end user to purchase a new vehicle. In one embodiment, the H-Brake is coupled to a vehicle's drive shaft, such that when the vehicle's brake is applied, a control member, such as a mechanical or electrical potentiometer or computer control, determines the correct application of the H-Brake, the conventional brake or a combination thereof. Generally such a mechanical or electrical potentiometer engages the H-Brake by variably increasing the field on the generator/alternator in response to the position of the vehicle's brake pedal or other braking mechanism. When the H-Brake is engaged, a generator/alternator is started and kinetic/inertial energy is resultantly transferred from the engine's drive shaft to the generator/alternator, causing resistance to be placed on the drive shaft and, accordingly, slowing/stopping of the vehicle. The vehicle is slowed/stopped either through the use of the H-Brake alone or through the use of the H-Brake in concert with the conventional brake(s). The generator/alternator uses this kinetic/inertial energy to produce electricity which is provided to an electrolyzer for the generation of hydrogen gas, which is preferably stored and subsequently provided as a fuel additive to the internal combustion engine.

As such, the H-Brake reclaims energy that would otherwise be lost during the braking process. For example, during typical vehicle braking, energy is lost as heat when the brakes are applied. Therefore, in addition to the generation of hydrogen gas which is used as a fuel additive to increase the relative efficiency of, and decrease the relative amount of pollutants produced by, a conventional internal combustion engine, use of the H-Brake results in decreased wear and tear on the conventional brakes, with all of the cost and other benefits attendant thereto, for example increasing the functional life of the vehicle's brake pads and reduced particulate emissions from brake pad wear.

In particular, the H-Brake may be provided as a retrofit kit for an internal combustion engine vehicle, without the need for replacing key vehicle components in order to obtain the efficiency and other advantages of hydrogen-enriched gasoline and regenerative braking. The H-Brake further provides for a regenerative braking system used in concert with an internal combustion engine, and may also be used on electric, hybrid and diesel vehicles. The H-Brake further provides control devices for controlling the gaseous and liquid fuel mixing.

In one embodiment, the H-Brake includes a conversion kit which uses a generator/alternator coupled to an internal combustion engine. Such a kit is beneficial as having few new components to be added to the vehicle, thereby adding a minimum of weight and control components. In another embodiment which is particularly suited for use in vehicles with either a standard or automatic transmission, a generator/alternator is coupled to the vehicle's drive shaft. In another embodiment, elements of the H-Brake are coupled to moving surfaces, either internally, such as the wheel, tire or axle of the vehicle, or externally, such as a trailer that is hitched to the rear of the vehicle. By coupling the H-Brake to an external moving surface, it may be readily connected and disconnected as needed.

As used in the H-Brake, regenerative braking includes, but is not limited to, the recapturing of kinetic/inertial energy from the vehicle, for example the drive shaft, during vehicle braking to in order to power a generator/alternator. The energy this is transferred from the drive shaft to the generator/alternator is used by the generator/alternator to produce electricity which is used to power an electrolyzer which converts water, provided from any suitable source, into hydrogen and oxygen. The hydrogen is then stored and/or mixed with gasoline (preferably through a control device which controls such mixing) to provide a hydrogen-enriched gasoline fuel to the internal combustion engine. The resulting hydrogen-enriched gasoline is then mixed with air via an air/fuel control member. Such a member may employ, for example a carburetor or similar mixing member or may involve a conventional fuel injection system where fuel mixes with air in the engine.

In the H-Brake, the parts thereof may be, for example, conventional, "off-the-shelf" parts, as understood by those of skill in the relevant art. As such, the H-Brake has the advantage of being readily assembled with reasonable cost and effort. As used in concert with a conventional internal combustion engine vehicle, a non-limiting list of parts in various embodiments of the H-Brake, and which are shown in more detail in the representative embodiments below, include: a H-Brake/conventional brake control member (for example, a mechanical or electrical potentiometer or computer control); an accelerator control member; an air/fuel control member; and internal combustion engine; a liquid fuel storage member; a liquid fuel line; a generator/alternator (for example, any suitable device which is able to convert mechanical energy into alternating current and direct current and having a variable field); a drive axle; a drive train; an electrolyzer; water and hydrogen storage member(s); a hydrogen gaseous/liquid fuel mixture control member; a drive shaft-mounted generator/alternator; a tire-coupled generator/alternator; a moving surface-coupled generator/alternator; and a moving surface-coupled generator/alternator control member.

With reference to the above parts, in a drive shaft mounted generator/alternator embodiment, the H-Brake includes a generator/alternator engaging the vehicle's drive shaft. One skilled in the art will appreciate that the generator/alternator may be coupled to the vehicle's drive shaft, for example, by disconnecting the drive shaft at a universal joint and connecting the alternator to the drive shaft through a spring extension shaft and to the vehicle's differential through a fixed extension, thus permitting the vehicle's kinetic/inertial energy to be transferred from the drive shaft to the generator/alternator. In this embodiment, an alternator may be used with a field that may be zero under normal conditions, varies when the brake pedal is first depressed (for example, during the first inch or so of brake depression) and then increases as further pressure is applied to the brake pedal. As the alternator's output increases, back pressure is applied by the alternator which causes the vehicle to slow/stop while generating electricity to drive the hydrogen generation process. The H-Brake provides variable braking power to the vehicle as a result of the alternator's controllable field.

As a result of the manner in which the generator/alternator is coupled to the drive shaft, this embodiment is suitable for use in vehicles having either an automatic or a manual transmission, although additional steps and/or parts may be required as compared to other embodiments of the H-Brake. Moreover, certain vehicles, including certain front and all-wheel vehicles, do not have a drive shaft, and, as such, are not, of course, suitable for use with this embodiment.

In another embodiment, the generator/alternator is friction-coupled to the vehicle's internal combustion engine, wherein the generator/alternator connects, for example, to the engine's crankshaft via a belt, such a conventional belt or v-belt. The generator/alternator that is used may be the vehicle's standard alternator or may be a replacement alternator, or an additional alternator may be used in concert with the vehicle's standard alternator. Depending on the vehicle and other factors, a replacement or additional alternator may be desired to generate a higher current than is possible with the vehicle's standard alternator. For example, conventional passenger vehicles may require a replacement or additional alternator, whereas larger vehicles, such as emergency service vehicles, may already have an alternator capable of producing sufficient current to drive the hydrogen generation process.

In this embodiment, engagement of the H-Brake causes the alternator to engage, thereby converting the engine's mechanical energy, transferred from the crankshaft via the belt, to the alternator, thereby slowing the vehicle and producing electricity which his used to drive the hydrogen generation process. Due to the mechanical connections involved in this embodiment, it is suitable for use primarily in vehicles having standard transmissions, however fewer steps and/or parts are generally required in this embodiment as compared to other embodiments of the H-Brake.

In another embodiment, the generator/alternator is coupled to a moving surface, for example a moving surface which is part of the vehicle (such as a wheel or tire) or external to the vehicle, such as a trailer. In this embodiment, the generator/alternator contacts, for example, a rotating surface to produce electricity and slow the rotation of the part to which it is coupled, thereby slowing the vehicle.

As discussed above, the hydrogen generation process begins when the H-Brake is engaged. Such engagement may occur through any suitable means. For example, such engagement may occur through mechanical, electrical or computerized means. As discussed above with regards to a drive shaft-coupled embodiment of the H-Brake, a mechanical means is sufficient for engagement of the H-Brake. For example, a microswitch, mechanical or electrical potentiometer, or rheostat may be used, such that the field strength in the alternator increases as the foot brake is depressed. Importantly, the H-Brake does not interfere with the use of the conventional brakes when needed to suddenly stop the car. For example, in normal vehicle operation, when the foot brake is slowly depressed, there is an approximately one second delay before the vehicle's brake lights are turned on. Within that time frame, engagement of the H-Brake may occur by increasing the field strength in the alternator, as discussed, to begin the hydrogen generation process.

Under such normal operation, the H-Brake will, in addition to generating hydrogen, cause the vehicle to slow/stop due to the coupling of the generator/alternator to a part of the vehicle (for example, the drive shaft). However, if the vehicle driver needs to stop the vehicle suddenly, such as in an emergency situation, she may quickly and fully depress the vehicle foot brake, thereby engaging the conventional brakes to quickly slow/stop the vehicle without involvement of the H-Brake. In certain applications, it may be desired to employ a computerized means for engaging the H-Brake. Such a computerized means may include, for example, a pulse-width modulated current device. For example, a non-vehicular application of the H-Generation System where a computerized engagement means may be desirable is an elevator, where there may be a need to sense the load.

As discussed above, the H-Brake may be engaged by the vehicle driver through the normal foot brake. As such, a vehicle equipped with the H-Brake may be operated in the same manner as a conventional vehicle not having the H-Brake, and, as discussed above, provides the benefits of increased fuel efficiency, decreased pollutants, and decreased wear and tear on the vehicle's conventional braking components, while not interfering with the ability of the conventional brakes to stop the car, as needed.

In one embodiment, the H-Brake may be provided as a retrofit kit, wherein it may be purchased as a single unit and readily installed on an existing vehicle. Such a kit may include, for example, a high amperage alternator, an electric clutch to engage the alternator, a variable solenoid for controlling the alternator field with a brake actuator, a US Department of Transportation-approved hydrogen storage tank (for example a carbon fiber gas storage tank) a pressure regulator, a hydrogen delivery line, and carburetor fittings for the hydrogen delivery line. The pressure regulator serves to control the mixing of hydrogen gas (generated by the electrolyzer) with the gasoline/air mixture from the carburetor, and is attached to the engine's air intake manifold by drilling a small hole therein. As will be appreciated by one of skill in the art, the pressure regulator may also be used on vehicles having fuel injection systems. The pressure regulator includes a check valve and a pressure adjustable diaphragm. The diaphragm includes a set screw to set the rigidity of the diaphragm, thereby permitting adjustment depending on the horsepower of the vehicle onto which the H-Brake is installed.

Of course, various embodiments of the present invention include various kits having different components, as needed for the particular vehicle or other application with which it's use is intended.

When the vehicle's brake is applied, a control member, such as a mechanical or electrical potentiometer or computer control, determines whether to engage the H-Brake, the conventional brake or a combination thereof (for example, depending on the manner in which the foot brake is depressed). If the H-Brake is engaged, the generator/alternator is started and kinetic/inertial energy from the drive shaft is transferred to the generator/alternator, resulting in the production of electricity by the generator/alternator and slowing down of the drive shaft and, consequently, of the vehicle.

The electricity so produced is used by an electrolyzer to convert water into gaseous hydrogen and oxygen. The source of the water may be any suitable source, for example an on-board or external storage tank, or may be produced on-board the vehicle through another means. The gaseous hydrogen generated by the electrolyzer is then stored in a suitable on-board or external storage tank where it is available to be fed via a fuel line to be mixed with conventional fossil fuel (for example, gasoline, natural gas, diesel or biodiesel). Suitable computerized control means are employed to ensure proper hydrogen pressurization and, therefore, overall safety of the system.

The resulting hydrogen-enriched gasoline is then mixed with air via an air/fuel control member. Such a member may employ, for example a carburetor or similar mixing member or may involve a conventional fuel injection system where fuel mixes with air in the engine. The hydrogen-enriched gasoline has numerous benefits over conventional gasoline, as enumerated.

Where needed, control members, for example mechanical or electrical potentiometers or computer controls, ensure the proper operation of each part and operational step described herein. Moreover, the resistance placed on the drive shaft by the H-Brake, which serves to regulate the slowing and/or stopping of the vehicle, results in decrease utilization of the vehicle's conventional braking system. In this regard, the wear-and-tear on the brake pads and other braking system members is lessened and emissions of gases and particulates from brake pad wear reduced.

Turning now to specific non-limiting embodiments of the H-Brake, prophetic working examples are provided, further in view of the previous discussion of the operation of individual components of the H-Brake.

EXAMPLE 1

General H-Brake Operation in an Internal Combustion Engine Vehicle

An H-Brake is provided as a retrofit kit and installed on-board an internal combustion engine vehicle. The kit includes computerized brake and liquid/gas mixing control members, an electrolyzer, a water/hydrogen storage tank, conduits for supplying water to the electrolyzer and hydrogen to the storage tank and to the liquid/gas mixing control, and a means for coupling a generator/alternator to the drive shaft. Once the vehicle is in motion, the operator depresses the vehicle's foot brake which causes an increase in the alternator's field and thus results in back pressure on the drive train, resulting in slowing/stopping of the vehicle. Concurrently, the vehicle's inertial/kinetic energy is converted to electricity by the generator/alternator.

The electricity produced by the generator/alternator is then provided to an electrolyzer which utilizes a standard electrolytic solution such as potassium hydroxide and water to generate hydrogen gas. Additional water is supplied to the electrolyzer by the on-board tank, as needed. The hydrogen gas generated in this step is briefly stored in the on-board tank (which may be any suitable storage tank, such as a Department of Transportation-approved hydrogen storage tank) until the vehicle's accelerator is engaged. The tank is generally required because a relatively large current must be generated from the vehicle's alternator in order to slow the vehicle, resulting in the generation of a relatively large amount of hydrogen, which therefore must be stored before it is needed during vehicle acceleration.

When the vehicle begins to accelerate, the stored hydrogen gas is supplied to the liquid/gas mixing control member where it is mixed with gasoline. This is done in a controlled manner to ensure proper mixing, such as by a pressure regulator. The resulting hydrogen-enriched gasoline is then mixed with air through a fuel injector or carburetor for use as fuel by the internal combustion engine.

To further illustrated the operation of the H-Brake, an example drive cycle of a vehicle equipped with an H-Brake is shown in Table 1, below, and the corresponding conversion of kinetic energy to electrical energy for the generation of hydrogen and the storage and use of the hydrogen is shown in Table 2. As shown in Tables 1 and 2, in this example, when the vehicle is idle (0 mph), the H-Brake is inactive, all previously generated hydrogen is in storage (in this Example, 100% hydrogen means that the storage tank is full to capacity), and no hydrogen is being generated. As the vehicle accelerates from 0 mph to 30 mph, hydrogen is provided from the storage tank to the air manifold for use as a fuel additive for mixing with the vehicle's gasoline, such that by the time the vehicle has accelerated to 30 mph, all of the stored hydrogen has been used.

Once the vehicle reaches 30 mph, it stops accelerating and coasts, such that no hydrogen is generated. Subsequently, the H-Brake is engaged, as described herein, causing the vehicle to decelerate from 30 mph until it stops. During this deceleration phase, hydrogen is generated, as described herein, such that by the time the vehicle stops, 100% hydrogen has been generated by the H-Brake, which has also resulted in the slowing and stopping of the vehicle, either alone or in concert with the conventional brakes. The vehicle then idles, such that 100% hydrogen remains in storage, until the vehicle accelerates again and the hydrogen is used, repeating the cycle.

TABLE 1

Drive Cycle of Vehicle Equipped with H-Brake

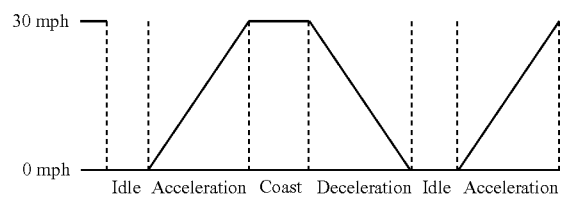

TABLE 2

Kinetic Energy Conversion/Hydrogen Storage and Use

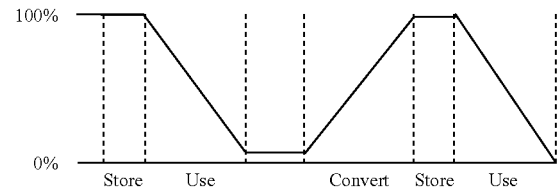

The fuel efficiency of a vehicle of this Example equipped with an H-Brake is shown in Table 3, which corresponds to both Tables 1 and 2. As shown in Table 3, when the vehicle is idle, the vehicle's fuel efficiency is 0 mpg. A vehicle not equipped with an H-Brake which has a fuel efficiency of 20 mpg during acceleration is, by comparison, expected to have a fuel efficiency of 40 mpg or more when equipped with an H-Brake, as shown in Table 3. The increased fuel efficiency of the vehicle is due to the additive of

TABLE 3

Fuel Efficiency of Vehicle With and Without H-Brake

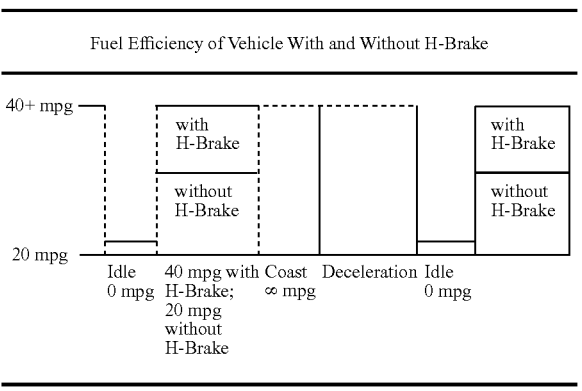

Additionally, a solar member may be part of the kit and installed on the vehicle such that the solar member utilizes solar energy to produce electricity to power the electrolyzer. This additional source of electricity supplements the electricity produced by the transfer of the vehicle's energy, and is further advantageous in that it permits the continued generation of hydrogen after the vehicle has stopped.

EXAMPLE 2

H-Brake Kinetic/Inertial Energy Conversion, Storage and Fuel Mixture Control Kit Drive Shaft Mounted Generator/Alternator Turning to FIG. 1, an embodiment of the H-Brake is shown in which a generator/alternator of the H-Brake engages a vehicle's drive shaft. Generator/alternator 102 engages drive shaft 104 such that when the vehicle's brake is applied, a control member, for example a mechanical or electrical potentiometer or a computer control member, determines the proper means for slowing/stopping the vehicle which includes the use of the H-Brake, the conventional braking system, or a combination thereof. Drive axle 106 also engages drive shaft 104 for turning the wheels.

When the H-Brake is employed, generator/alternator 102 is started and kinetic/inertial energy from drive shaft 104 is transferred to generator/alternator 102 which generates electricity and slows the vehicle. The electricity so produced is fed to an electrolyzer 108 which converts water into gaseous hydrogen and oxygen. As shown in FIG. 1, a tank 110 may be used to store both the water used in the electrolytic reaction as well as the hydrogen generated by the electrolytic reaction. Liquid (or gaseous) fuel storage member 112 stores conventional fossil fuel to be used by the internal combustion engine and which is delivered to hydrogen gas/liquid (gaseous) fuel mixture control member 114 by a fuel line 116.

Upon acceleration, hydrogen gas and liquid (gaseous) fuel are then fed from tank 110 and storage member 112, respectively, to hydrogen gas/liquid fuel mixture control member 114 which regulates the mixing of the gaseous hydrogen and liquid fuel. An air/fuel control member 118 then causes the mixing of air with the hydrogen-enriched fuel for use in the internal combustion engine 120. As discussed previously, air/fuel control member 118 may employ, for example, a carburetor or similar mixing member or may involve a conventional fuel injection system where fuel mixes with air in the engine.

EXAMPLE 3

Figure 2:
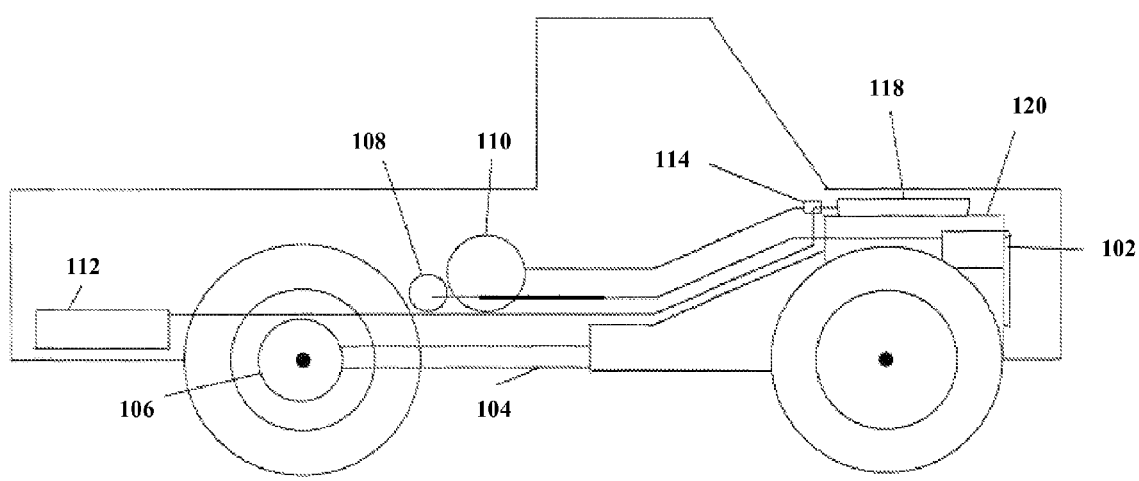
FIG. 2 shows a H-Brake kinetic/inertial energy conversion, storage and fuel mixture control kit with a generator/alternator friction-coupled to an internal combustion engine of the present invention.
Figure 3:
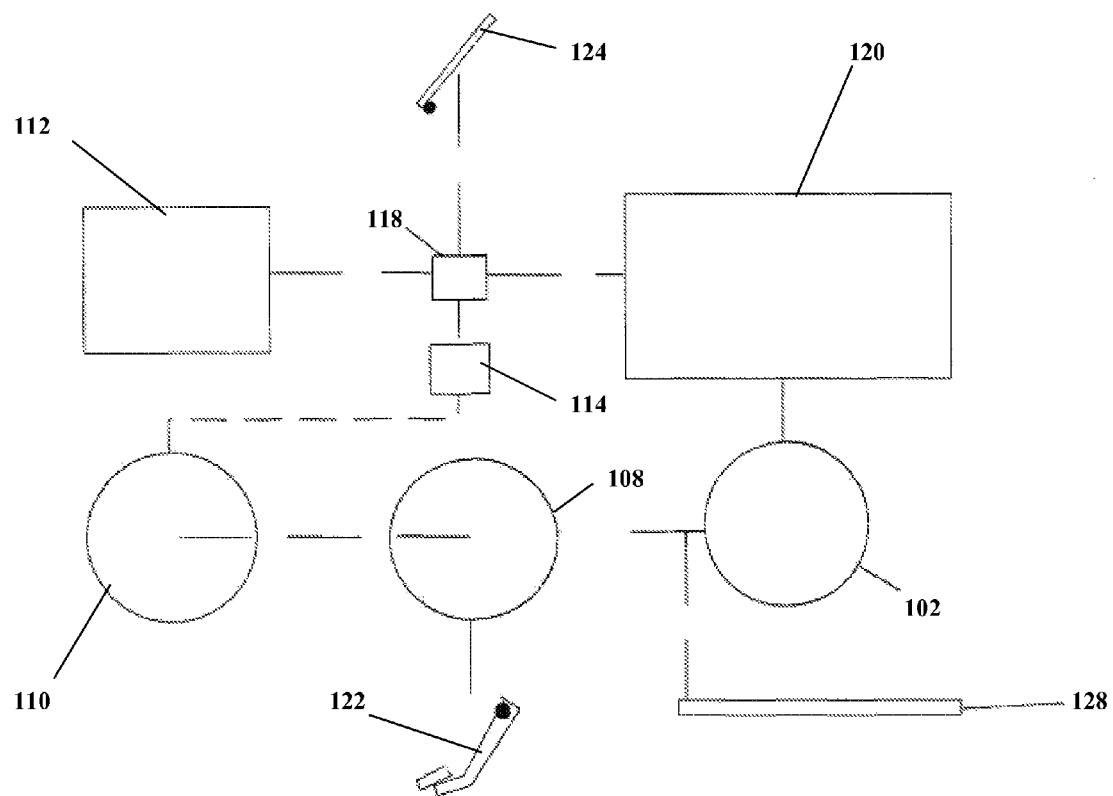
FIG. 3 shows a H-Brake kinetic/inertial energy conversion kit flow diagram with a generator/alternator friction-coupled to an internal combustion engine of the present invention.

H-Brake Kinetic/Inertial Energy Conversion, Storage and Fuel Mixture Control Kit Generator/Alternator Friction-Coupled to Engine As shown in FIGS. 2 and 3, another embodiment of the H-Brake includes a generator/alternator friction-coupled to the vehicle's internal combustion engine. Turning to FIG. 2, generator/alternator 102 is friction-coupled (such as by a belt) to the internal combustion engine 120 such that when the vehicle's brake is applied, a control member determines the proper means for slowing/stopping the vehicle which includes the use of the H-Brake, the conventional braking system, or a combination thereof.

When the H-Brake is employed, generator/alternator 102 is started and kinetic/inertial energy from engine 120 is transferred to generator/alternator 102, slowing the engine and vehicle, and generating electricity. The electricity so produced is fed to electrolyzer 108 which converts water into gaseous hydrogen and oxygen. As shown in FIG. 2, a tank 110 may be used to store both the water used in the electrolytic reaction as well as the hydrogen generated by the electrolytic reaction. Liquid (gaseous) fuel storage member 112 stores conventional fossil fuel to be used by the internal combustion engine.

Upon acceleration hydrogen gas and liquid (gaseous) fuel are then fed from tank 110 and storage member 112, respectively, to a hydrogen gas/liquid fuel mixture control member 114, which regulates the mixing of the gaseous hydrogen and liquid fuel. An air/fuel control member 118 then causes the mixing of air with the hydrogen-enriched fuel for use in the internal combustion engine 120. As discussed previously, air/fuel control member 118 may employ, for example, a carburetor or similar mixing member or may involve a conventional fuel injection system where fuel mixes with air in the engine.

Turning to FIG. 3, a flow diagram of this generator/alternator friction-coupled to an engine embodiment is shown, which diagrammatically shows operation of the H-Brake as described above. Included in FIG. 3 are H-Brake/conventional brake control member 122 and accelerator control member 124. When H-Brake/conventional brake control member 122 is engaged, a control member determines the proper means for slowing/stopping the vehicle which includes the use of the H-Brake, the conventional braking system, or a combination thereof. Accelerator control member 124 is capable of increasing the flow of the hydrogen/gasoline mixture to engine 120. Also shown in FIG. 3 is a solar member 128 for further generating electricity to fuel electrolyzer 108.

EXAMPLE 4

Figure 4:
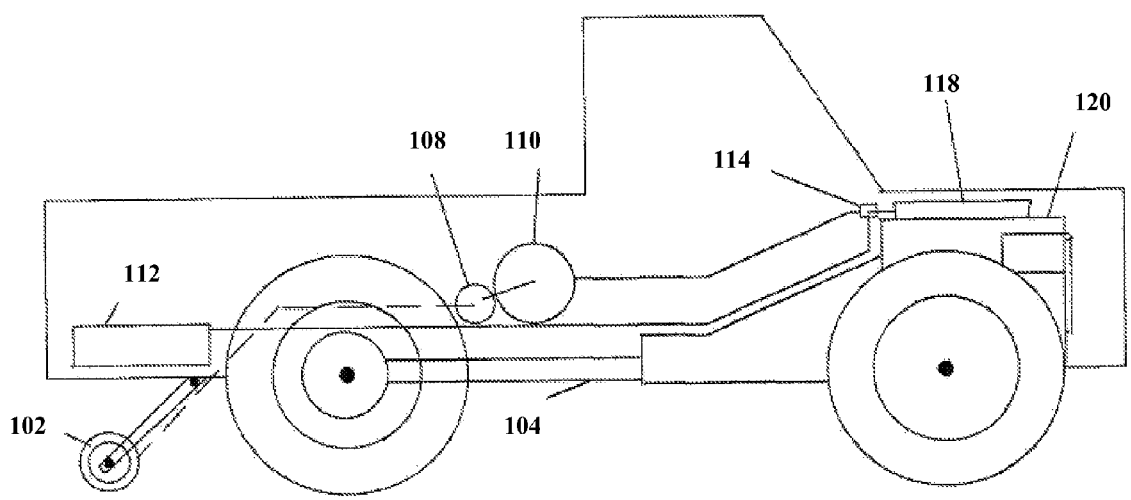
FIG. 4 shows a H-Brake kinetic/inertial energy conversion, storage and fuel mixture control kit with a moving surface-coupled generator/alternator of the present invention.
Figure 5:
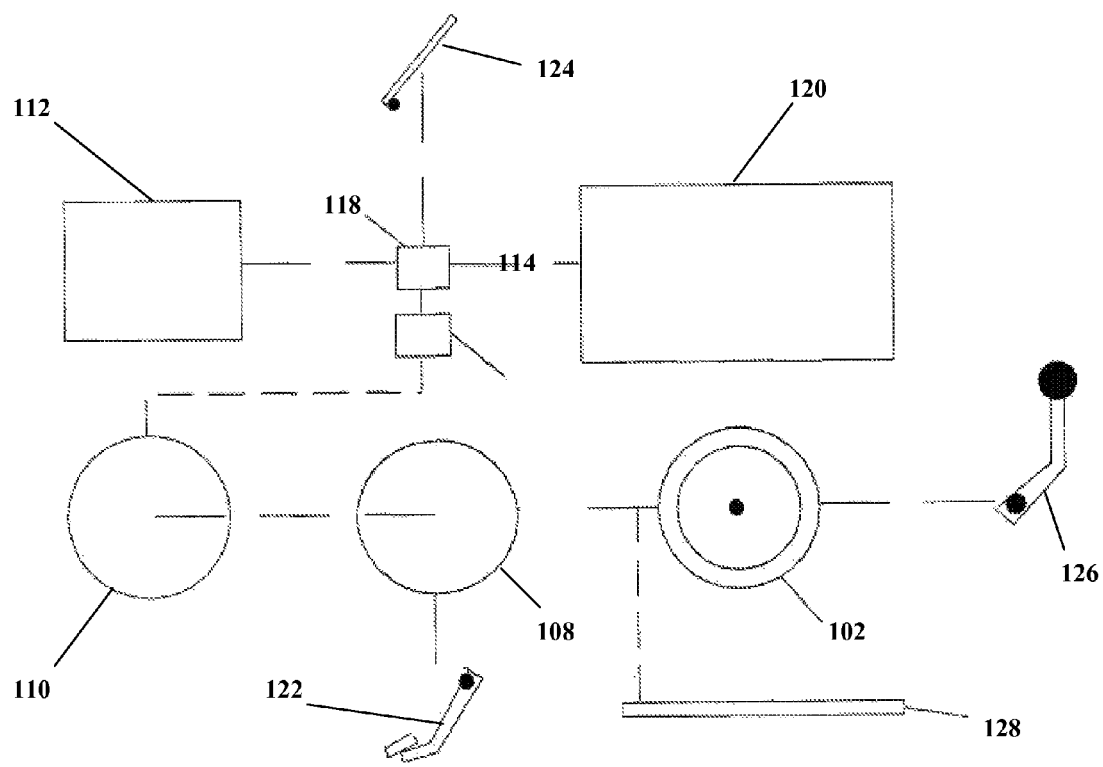
FIG. 5 shows a H-Brake kinetic/inertial energy conversion kit flow diagram of a moving surface-coupled generator/alternator of the present invention.

H-Brake Kinetic/Inertial Energy Conversion, Storage and Fuel Mixture Control Kit Moving Surface Coupled Generator/Alternator As shown in FIGS. 4 and 5, another embodiment of the H-Brake includes a generator/alternator coupled to a moving surface.

Turning to FIG. 4, generator/alternator 102 is coupled to a moving surface, for example an electric drive wheel which is in contact with the road such that when the vehicle's brake is applied, a control member determines the proper means for slowing/stopping the vehicle which includes the use of the H-Brake, the conventional braking system, or a combination thereof. When the H-Brake is employed, generator/alternator 102 is started and kinetic/inertial energy from the electric drive wheel is transferred to generator/alternator 102 which generates electricity.

The electricity so produced is fed to electrolyzer 108 which converts water into gaseous hydrogen and oxygen. As shown in FIG. 4, a tank 110 may be used to store both the water used in the electrolytic reaction as well as the hydrogen generated by the electrolytic reaction. Liquid fuel storage member 112 stores conventional fossil fuel to be used by the internal combustion engine.

Hydrogen gas and liquid fuel are then fed from tank 110 and storage member 112, respectively, to a hydrogen gas/liquid fuel mixture control member 114 which regulates the mixing of the gaseous hydrogen and liquid fuel. An air/fuel control member 118 then causes the mixing of air with the hydrogen-enriched fuel for use in the internal combustion engine 120. As discussed previously, air/fuel control member 118 may employ, for example, a carburetor or similar mixing member or may involve a conventional fuel injection system where fuel mixes with air in the engine.

Turning to FIG. 5, a flow diagram of this moving surface-coupled generator/alternator embodiment is shown, which diagrammatically shows operation of the H-Brake as described above. Included in FIG. 5 are H-Brake/conventional brake control member 122, accelerator control member 124 and moving surface-coupled generator/alternator control member 126. Also shown in FIG. 5 is a solar member 128 for further generating electricity to fuel electrolyzer 108.

When H-Brake/conventional brake control member 122 is engaged, a control member determines the proper means for slowing/stopping the vehicle which includes the use of the H-Brake, the conventional braking system, or a combination thereof. Accelerator control member 124 is capable of increasing the flow of the hydrogen/gasoline mixture to engine 120. Moving surface-coupled generator/alternator control member 126 is useful for controlling the operation of generator/alternator 102.

EXAMPLE 5

Figure 6:
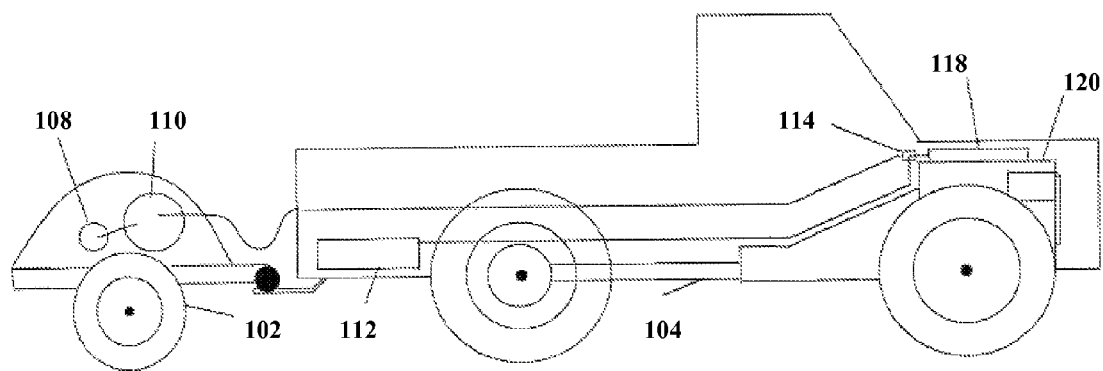
FIG. 6 shows a H-Brake kinetic/inertial energy conversion, storage and fuel mixture control kit with an external moving surface-coupled generator/alternator of the present invention.

H-Brake Kinetic/Inertial Energy Conversion, Storage and Fuel Mixture Control Kit External Moving Surface Coupled Generator/Alternator As shown in FIG. 6, another embodiment of the H-Brake includes an external generator/alternator coupled to a moving surface. Turning to FIG. 6, generator/alternator 102 is coupled to a moving surface, for example via a trailer wheel which is in contact with the road such that when the vehicle's brake is applied, a control member determines the proper means for slowing/stopping the vehicle which includes the use of the H-Brake, the conventional braking system, or a combination thereof. When the H-Brake is employed, generator/alternator 102 is started and kinetic/inertial energy from the trailer wheel is transferred to generator/alternator 102 which generates electricity.

The electricity so produced is fed to electrolyzer 108 which converts water into gaseous hydrogen and oxygen. As shown in FIG. 6, a tank 110 may be used to store both the water used in the electrolytic reaction as well as the hydrogen generated by the electrolytic reaction. Electrolyzer 108, tank 110 and external generator/alternator 102 may be housed in part or in whole in a trailer member which is connected to the vehicle, such as by a conventional hitch mechanism. Liquid fuel storage member 112 stores conventional fossil fuel to be used by the internal combustion engine.

Hydrogen gas and liquid fuel are then fed from tank 110 and storage member 112, respectively, to a hydrogen gas/liquid fuel mixture control member 114 which regulates the mixing of the gaseous hydrogen and liquid fuel. An air/fuel control member 118 then causes the mixing of air with the hydrogen-enriched fuel for use in the internal combustion engine 120. As discussed previously, air/fuel control member 118 may employ, for example, a carburetor or similar mixing member or may involve a conventional fuel injection system where fuel mixes with air in the engine.

EXAMPLE 6

Figure 7:
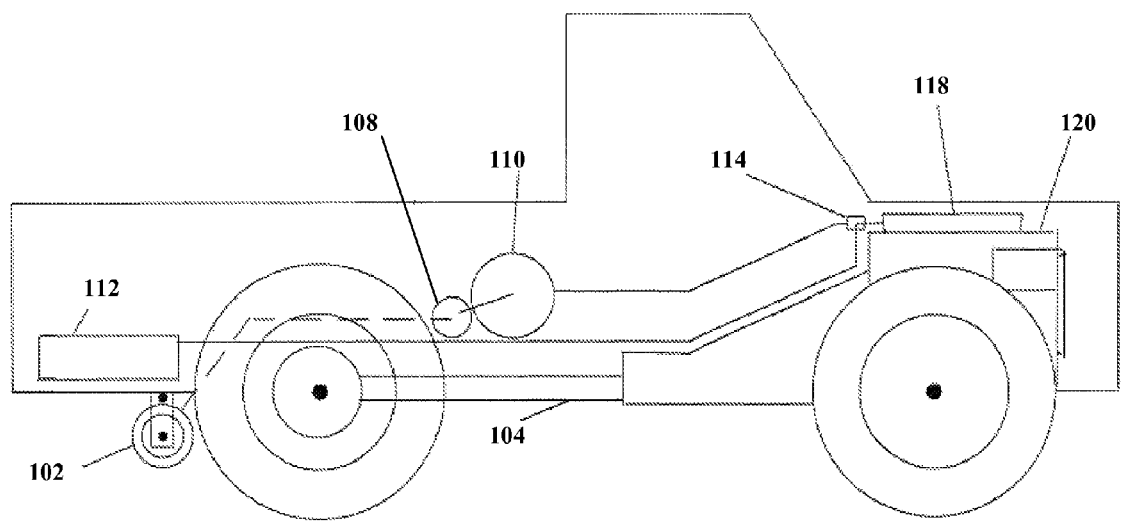
FIG. 7 shows a H-Brake kinetic/inertial energy conversion, storage and fuel mixture control kit with a friction-coupled generator/alternator of the present invention.

H-Brake Kinetic/Inertial Energy Conversion, Storage and Fuel Mixture Control Kit Wheel/Tire/Axle Friction-Coupled Generator/Alternator As shown in FIG. 7, another embodiment of the H-Brake includes a generator/alternator friction-coupled to a wheel/tire/axle of a vehicle. Turning to FIG. 7, generator/alternator 102 is coupled to a wheel/tire of the vehicle such that when the vehicle's brake is applied, a control member determines the proper means for slowing/stopping the vehicle which includes the use of the H-Brake, the conventional braking system, or a combination thereof. When the H-Brake is employed, generator/alternator 102 is started and kinetic/inertial energy from the wheel/tire of the vehicle is transferred to generator/alternator 102 which generates electricity.

The electricity so produced is fed to electrolyzer 108 which converts water into gaseous hydrogen and oxygen. As shown in FIG. 7, a tank 110 may be used to store both the water used in the electrolytic reaction as well as the hydrogen generated by the electrolytic reaction. Liquid fuel storage member 112 stores conventional fossil fuel to be used by the internal combustion engine.

Hydrogen gas and liquid fuel are then fed from tank 110 and storage member 112, respectively, to a hydrogen gas/liquid fuel mixture control member 114 which regulates the mixing of the gaseous hydrogen and liquid fuel. An air/fuel control member 118 then causes the mixing of air with the hydrogen-enriched fuel for use in the internal combustion engine 120. As discussed previously, air/fuel control member 118 may employ, for example, a carburetor or similar mixing member or may involve a conventional fuel injection system where fuel mixes with air in the engine.

EXAMPLE 7

Figure 8:
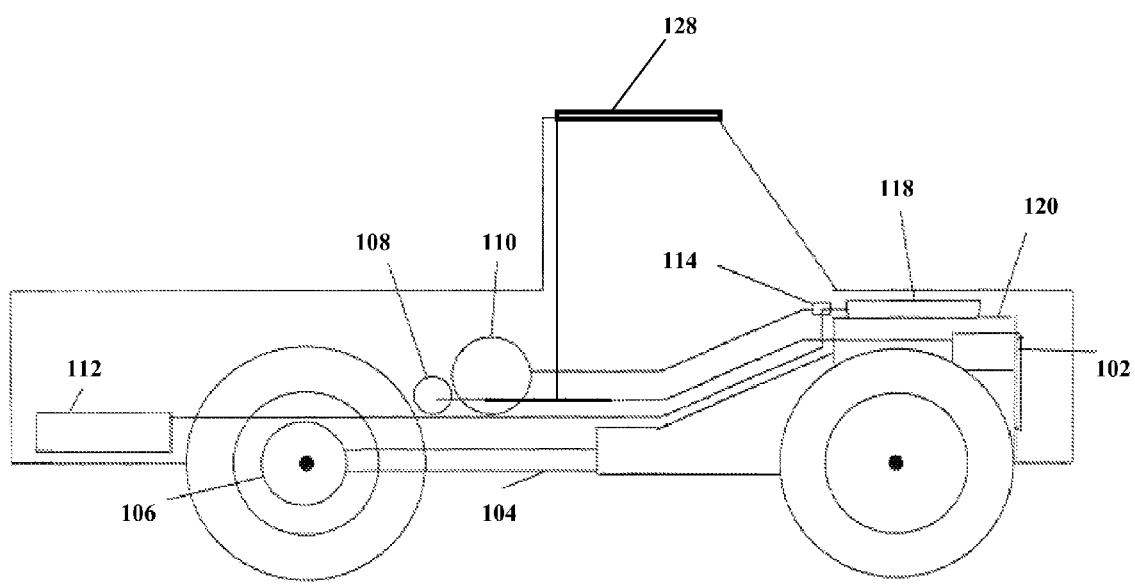
FIG. 8 shows a H-Brake kinetic/inertial energy conversion, storage and fuel mixture control kit of FIG. 2 with a solar member for further powering an electrolyzer.

H-Brake Kinetic/Inertial Energy Conversion, Storage and Fuel Mixture Control Kit Generator/Alternator Friction-Coupled to Engine in Combination with a Solar Member As shown in FIG. 8, another embodiment of the H-Brake includes a generator/alternator friction-coupled to the vehicle's internal combustion engine in combination with a solar member 128. Turning to FIG. 8, generator/alternator 102 is friction-coupled (such as by a belt) to the internal combustion engine 120 such that when the vehicle's brake is applied, a control member determines the proper means for slowing/stopping the vehicle which includes the use of the H-Brake, the conventional braking system, or a combination thereof.

When the H-Brake is employed, generator/alternator 102 may be started and kinetic/inertial energy from engine 120 is transferred to generator/alternator 102, slowing the engine and vehicle, and generating electricity. Solar member 128 also produces electricity for use by electrolyzer 108, either alone or in combination with generator/alternator 102. The electricity so produced is fed to electrolyzer 108 which converts water into gaseous hydrogen and oxygen. As shown in FIG. 8, a tank 110 may be used to store both the water used in the electrolytic reaction as well as the hydrogen generated by the electrolytic reaction. Liquid (gaseous) fuel storage member 112 stores conventional fossil fuel to be used by the internal combustion engine.

Upon acceleration hydrogen gas and liquid (gaseous) fuel are then fed from tank 110 and storage member 112, respectively, to a hydrogen gas/liquid fuel mixture control member 114 which regulates the mixing of the gaseous hydrogen and liquid fuel. An air/fuel control member 118 then causes the mixing of air with the hydrogen-enriched fuel for use in the internal combustion engine 120. As discussed previously, air/fuel control member 118 may employ, for example, a carburetor or similar mixing member or may involve a conventional fuel injection system where fuel mixes with air in the engine.

As will be apparent to one of skill in the relevant art, solar member 128 may be used in any embodiment of the present invention for supplementing the electricity provided to electrolyzer 108.

As shown in the above non-limiting embodiments, the H-Brake is suited for use as a retrofit kit on a conventional internal combustion engine vehicle and the H-Generation System is suited for use as a retrofit kit on a conventional stationary combustion device. The retrofit kit may be used in an number of ways, some of which are shown without limitation in the examples above. For example, a generator/alternator used in the H-Brake may be powered upon application of the brake by external or on-board friction, for example from a trailer wheel/tire (external) or an electrical drive wheel or vehicle wheel/tire (on-board).

Other means of on-board electric generation include coupling the engine to the electrical generator/alternator via belt drive, gear coupling of the flywheel to the electrical generator/alternator, coupling of the drive shaft to the electrical generator/alternator via belt drive, direct coupling of the drive shaft to the electrical generator/alternator and coupling of the wheel to the electrical generator/alternator through electromagnetic coupling, for example through pulsed direct current using rotary and linear devices (including vertical and horizontal motion) and through the Faraday effect (metal wheel rim to electrical generation).

As will be appreciated by those of skill in the art, the H-Brake is suitable for use with, and beneficial to, numerous applications in which the transfer of otherwise wasted heat energy from braking can be recaptured for use in powering a reaction, such as powering a generator/alternator to produce electricity for driving an electrolytic reaction for the generation of hydrogen as a fuel source. Such application include, for example, elevator systems and lift cranes.

EXAMPLE 8

Figure 9:
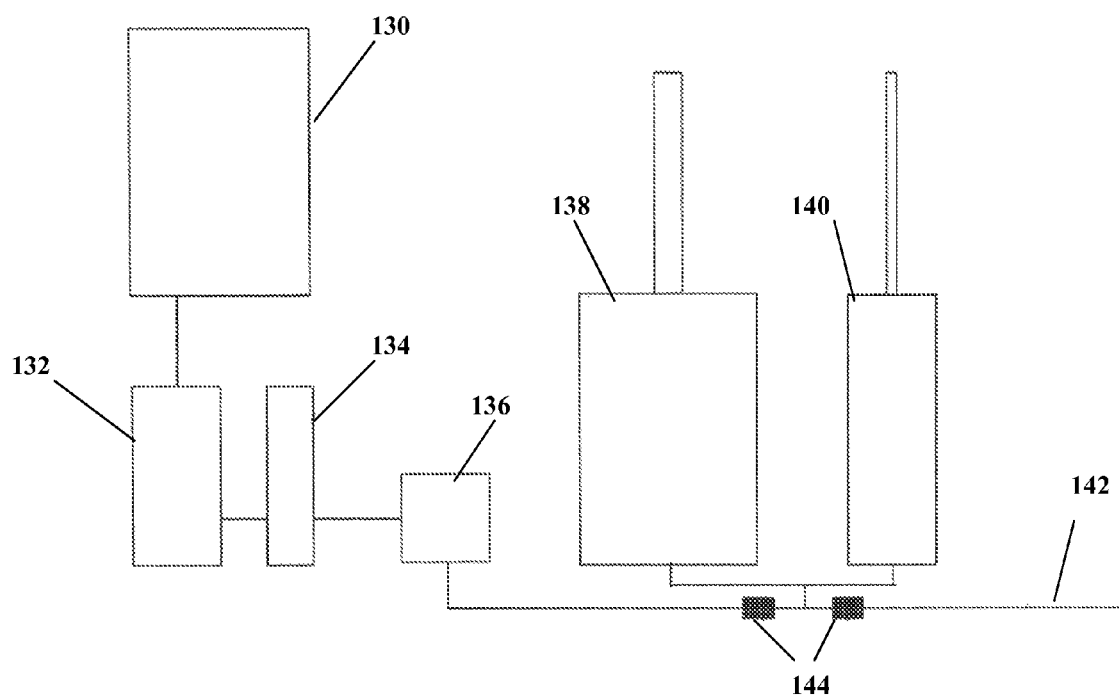
FIG. 9 shows a H-Generation renewable energy conversion, storage and fuel mixture control kit for use in conjunction with fossil fuels in stationary applications.

H-Gen Renewable Energy Conversion, Storage and Fuel Mixture Control Kit Stationary Combustion Equipment in Combination with a Solar or Other Renewable Energy Member As shown in FIG. 9, another embodiment of the inventive H-Generation System includes a renewable energy generator 130 (for example, powered by solar electric, wind, water, or biomass) coupled to an electrolyzer 132 to provide the electricity for the electrolysis of water into hydrogen and oxygen. The generated hydrogen is stored in a suitable storage member 134 for use when needed by combining the stored hydrogen through the hydrogen gas control member 136 (for example, a computer or mechanical pressure regulator) with conventional fossil fuels (for example, natural gas, propane, butane, LPG, LNG or biogas) in powering stationary combustion equipment such as a conventional space heater 138 or water heater 140. Of course, as will be appreciated by one of skill in the art, the present invention may be used with any stationary device that utilizes the combustion of fossil fuels, by way of further example, refrigerators, standby electrical generators and pumps driven by gas engines, and gas lighting and cooking devices. Check valves 144 provide a means for preventing fuel mixture in undesired directions. The use of a pressure regulator preferably regulates the delivery of hydrogen at a pressure similar to that of conventional natural gas or propane, for example, at approximately 0.5 psi. Generally, variable input control is not needed/desired for such stationary applications to power renewable energy generator 130.

When the H-Generation System is employed, renewable generator 130 produces electricity for use by electrolyzer 132 which converts water into gaseous hydrogen and oxygen. As shown in FIG. 9, a storage member 134 may be used to store both the water used in the electrolytic reaction as well as the hydrogen generated by the electrolytic reaction. Conventional fossil fuel to be used by the stationary combustion device is supplied by fuel line 142 from a conventional source.

Upon initiation of combustion hydrogen gas and fossil fuels are then fed from the conventional source fuel line 142 and storage member 134, respectively, to the stationary combustion device. A hydrogen gas control member 136 regulates the pressure of the gaseous hydrogen. Providing for the mixing of hydrogen with the conventional fossil fuel for use in the stationary combustion devices 138 and 140. As will be apparent to one of skill in the relevant art, a H-Generation System of the present invention is suitable for use in any device powered by a fossil fuel, in particular where the efficiency of such device is increased and/or the pollutants resulting from said device are decreased, by the addition of hydrogen to the fossil fuel. Moreover, one of skill in the relevant art will appreciate that a solar member may also be provided in any embodiments of the present invention, including such stationary embodiments, as a source of electricity for the electrolyzer.

Once given the above disclosure, many other features, modifications, and improvements will become apparent to the skilled artisan. Such other features, modifications, and improvements are therefore considered to be part of this invention, the scope of which is to be determined by the following claims:

What is claimed is:

1. A vehicle hydrogen generation retrofit kit functionally installed, as an aftermarket product, on an internal combustion engine vehicle configured for operating utilizing fuels selected from the group consisting of fossil fuels and biodiesel fuels, said retrofit kit comprising:
- a generator/alternator for generating electricity, wherein said generator/alternator being structurally configured and so installed such that it is capable of engaging a member or a moving surface of a said internal combustion engine vehicle such that energy resulting from braking of said internal combustion engine vehicle is transferred to and utilized by said generator/alternator to generate electricity;
- an electrolyzer capable of being connected to said generator/alternator to utilize said electricity generated by said generator/alternator to generate hydrogen;
- a storage tank capable of being connected to said electrolyzer to receive and store said hydrogen generated by said electrolyzer;
- a fuel mixture control member capable of being so installed and structurally configured such that it regulates the mixture of said hydrogen produced by said electrolyzer with said fossil or biodiesel fuel to form a hydrogen/fuel mixture, and such that it regulates hydrogen/fuel composition of said mixture; and
- a hydrogen delivery member capable of being connected to said storage tank to provide said hydrogen stored therein to said fuel mixture control member,
- wherein, when said generator/alternator, said electrolyzer, said storage tank, said fuel mixture control member, and said hydrogen delivery member are so configured and so installed, in combination as said aftermarket retrofit kit, on said internal combustion engine vehicle, said generator/alternator is coupled to a member or a moving surface of said internal combustion engine vehicle such that energy resulting from braking of said internal combustion engine vehicle is transferred from said member or said moving surface of said internal combustion engine vehicle to said generator/alternator which utilizes said energy to generate electricity, said electricity generated by said generator/alternator is then provided to said electrolyzer which utilizes said electricity to generate hydrogen, said hydrogen is then stored in said storage tank, said stored hydrogen is then provided, by said hydrogen delivery member, to said fuel mixture control member for mixing with fossil or biodiesel fuel to produce hydrogen-enriched fossil or biodiesel fuel which is then provided to combustion chambers of said internal combustion engine vehicle during operation, whereby increased fuel efficiency of said internal combustion engine vehicle is thereby achieved.

2. A vehicle hydrogen generation retrofit kit according to claim 1, wherein said vehicle member is a drive shaft.

3. A vehicle hydrogen generation retrofit kit according to claim 1, wherein said vehicle member is an engine or engine component.

4. A vehicle hydrogen generation retrofit kit according to claim 1, further comprising an engagement member for increasing the field of said generator/alternator.

5. A vehicle hydrogen generation retrofit kit according to claim 4, wherein said engagement member is selected from the group consisting of a mechanical potentiometer, an electrical potentiometer, and a computer control member.

6. A vehicle hydrogen generation retrofit kit according to claim 5, wherein said engagement member is a rheostat.

7. A vehicle hydrogen generation retrofit kit according to claim 5, wherein said engagement member is a pulse-width modulated current device.

8. A vehicle hydrogen generation retrofit kit according to claim 1, further comprising a solar member.

9. A vehicle hydrogen generation retrofit kit according to claim 1, wherein said vehicle member is a wheel, tire or axle.

10. A vehicle hydrogen generation retrofit kit according to claim 9, wherein said generator/alternator engages said wheel, tire or axle through electromagnetic coupling.

11. A vehicle hydrogen generation retrofit kit according to claim 1, wherein said fuel mixture control member for mixing said hydrogen with a fossil fuel is a pressure regulator.

12. A vehicle hydrogen generation retrofit kit according to claim 1, further comprising a receptacle for storing water for use by said electrolyzer to generate hydrogen.

13. A vehicle hydrogen generation retrofit kit according to claim 3, wherein said generator/alternator is capable of engaging said engine or engine component by a belt.

14. A vehicle hydrogen generation retrofit kit according to claim 1, wherein said generator/alternator is activated to cause said vehicle braking energy to be transferred to and utilized by said generator/alternator by depression of a vehicle brake pedal.

15. A vehicle hydrogen generation retrofit kit according to claim 14, wherein the field level of said generator/alternator increases proportionally to the amount of brake pedal depression.

16. A vehicle hydrogen generation retrofit kit according to claim 1, wherein said fuel mixture control member is activated to regulate the mixing of said hydrogen and said fossil or biodiesel fuel by depression of a vehicle accelerator pedal.

17. A vehicle hydrogen generation retrofit kit according to claim 16, wherein the amount of hydrogen mixed with said fossil or biodiesel fuel is proportional to the amount of accelerator pedal depression.

* * * * *